Patented Feb. 17, 1942

2,273,664

UNITED STATES PATENT OFFICE 2,273,664

PEST CONTROL

Norman E. Searle, Wilmington, Del., assignor to E. I. du Pont de Nemours & Company, Wilmington, Del., a corporation of Delaware No Drawing. Application April 21, 1939, Serial No. 269,098

9 Claims. (Cl. 167—33)

This invention relates to compositions toxic to economically harmful lower forms of life, more particularly to compositions useful in controlling the development and growth of micro-organisms which deleteriously infest plant and animal matter either in the natural or fabricated state, and still more particularly to new fungicidal and bactericidal compositions containing as an essential active ingredient one or more of a group of compounds hereinafter termed cyclic aminomethyl sulfides.

The cyclic aminomethyl sulfides which constitute the active agents of the fungicidal and bactericidal compositions of this invention are compounds which are in general obtained by the interaction of a primary aliphatic amine or ammonia, an aliphatic aldehyde, and hydrogen sulfide. Such reactions lead to a wide variety of products, depending upon the choice of the three reagents and the particular conditions under which the condensation is effected. Several reactions of this type are known, and a number of the products have been isolated and tentatively identified by chemical structure, but the chemistry involved is in some instances controversial, many of the products being poorly defined and very likely consisting of complex mixtures. However, it may be definitely said that the types of reagents mentioned condense to give heterocyclic compounds the ring structure of which is saturated and composed of carbon, nitrogen, and sulfur atoms arranged in that fixed sequence wherein the hetero atoms alternate with the carbon atoms. It is this type of compound to which I refer by the expression "cyclic aminomethyl sulfide."

This arrangement of the carbon, nitrogen, and sulfur atoms in a saturated ring structure is a natural function of the three reagents employed and may be better understood from the following résumé of the prior art relating to the preparation and structure of various cyclic aminomethyl sulfides whose use in pest control compositions is the subject of the present invention.

A. Derivatives of 1,3-thiazetane

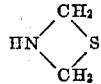

1. Le Févre and Le Févre (J. Chem. Soc. 1932, 1142–1148) made both the 3-methyl and the 3-ethyl derivatives of the above compound from the appropriate amine, hydrogen sulfide, and formaldehyde. The methyl derivative was a crystalline solid melting at 138–9° C.; the ethyl, an oil which could not be distilled without total decomposition.

2. Graymore (J. Chem. Soc. 1935, 865) obtained 3-methyl-1,3-thiazetane by saturating an aqueous solution of trimethyltrimethylenetriamine with $H_2S$.

B. Derivatives of 5,6-dihydro-1,3,5-dithiazine

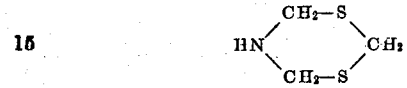

1. 5,6-dihydro-1,3,5-dithiazine formothialdine) was prepared by Levi [Atti accad. Lincei, 9, 424–7 (1929); Chem. Abs. 23, 4704 (1929); Brit. Chem. Abs. 1929, 707] by treating formaldehyde solution with ammonium sulfide or ammonium acid sulfide. The product obtained was a resinous, insoluble powder that decomposed at 70° C. The same product was also obtained by treating an ammoniacal solution of trioxymethylene with hydrogen sulfide. These reaction products were undoubtedly mixtures of substances containing more or less of the cyclic aminomethyl sulfide, formothialdine.

2. Wohl [Ber. 19, 2346 (1886)] prepared 5-methyl-5,6-dihydro-1,3,5-dithiazine (N-methylformothialdine) by reacting formaldehyde and hydrogen sulfide with aqueous methylamine. This was a well-defined, crystalline product melting at 65° C.

3. The above product was also made by Le Févre and Le Févre (J. Chem. Soc. 1932, 1142) and Graymore (ibid. 1935, 866).

4. Wohler and Liebig [Ann. 61, 1 et seq. (1847)] obtained 2,4,6-trimethyl-5,6-dihydro-1,3,5-dithiazine (thialdine) by the action of hydrogen sulfide on aqueous aldehydeammonia. This product has the cyclic aminomethyl sulfide structure,

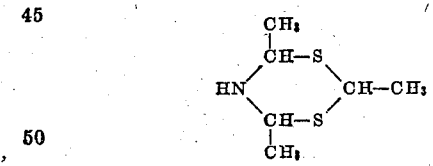

5. 2,4,5,6-tetramethyl-5,6-dihydro-1,3,5-dithiazine (methylthialdine) was prepared by Markwald [Ber. 19, 2378–82 (1886)] by reacting methylamine with thioaldehyde.

C. $C_5H_{10}N_2S_2$ compounds and derivatives

1. The product designated as pentamethylenediaminedisulfine, and later as pentamethylenediaminodisulfide, was prepared by Delepine [Ann. 7, 570 (1889)] by treating aqueous formaldehyde with ammonium hydrogen sulfide. Delepine assigned the 5,6-dihydro-1,3,5-dithiazine structure:

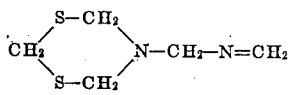   A

2. What is reported to be the same product was also prepared by Le Févre and Le Févre (J. Chem. Soc. 1932, 1147), who in a later paper (J. Chem. Soc. 1932, 2087) suggested that the product has the 3,7-dithia-1,5-diazabicyclo(3.3.1)nonane structure:

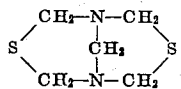   B

3. Ter Horst (U. S. P. 2,050,204, Aug. 4, 1936) also prepared "pentamethylenediaminodisulfide."

4. Teppema (U. S. P. 2,084,011, June 15, 1937) prepared an addition product of pentamethylenediaminodisulfide and mercaptobenzothiazole and assigned the 5-(2'-benzothiazolylthiomethylaminomethyl)-5,6-dihydro-1,3,5-dithiazine structure:

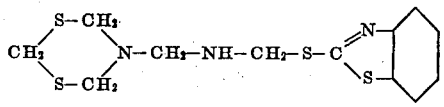

Though the above citations show that the structure of many of the cyclic aminomethyl sulfides is not precisely known, they nevertheless are in agreement that the reaction takes a definite course which is governed by the nature of the three reagents heretofore specified, each of which contributes a characteristic element of structure to the products. Thus, the aldehyde provides methylene or mono-substituted methylene groups; the primary amine or ammonia provides the amino group or groups; and the hydrogen sulfide provides the divalent sulfur atom or atoms. These three characteristic elements unite in that fixed sequence wherein the hetero atoms alternate with the carbon atoms thereby precluding nitrogen to nitrogen, sulfur to sulfur, and sulfur to nitrogen linkages. For example, the simplest structure, a 1,3-thiazetane, may be formed as follows:

I. 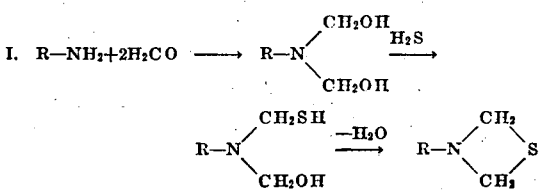

A 5,6-dihydro-1,3,5-dithiazine may conceivably be formed by similar reactions.

II. 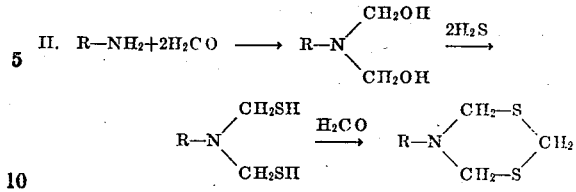

Or in the case of the more complicated bicyclic structure, the following may represent the course of the reaction:

III. 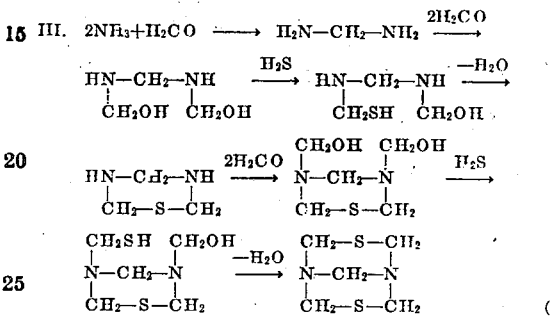

(B)

Or the latter reaction may take a different course to give a twinned cyclic structure as follows:

IV. 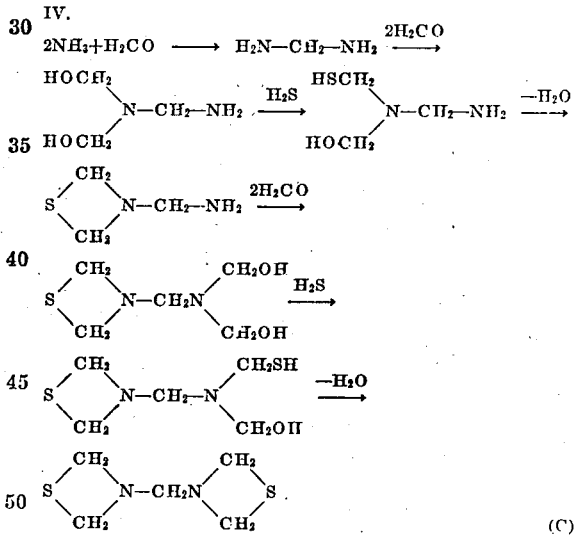

(C)

Or it may proceed thus:

V. 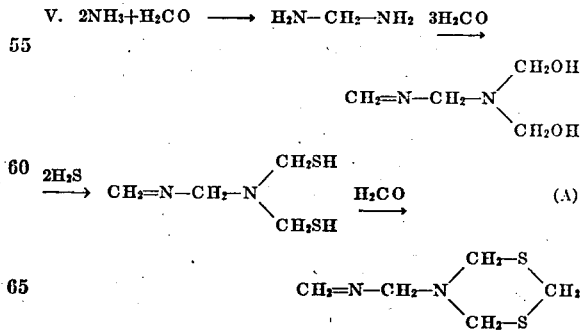

(A)

It is to be noted that in all these instances the cyclic aminomethyl sulfide structure is obtained, i. e., each product is characterized by a saturated ring composed of carbon, nitrogen, and sulfur atoms arranged in that fixed sequence wherein the hetero atoms alternate with the carbon atoms.

It may be observed further that the last three reactions would yield products of the same molecular formula $C_5H_{10}N_2S_2$. At least one such product is reported in the literature (references C-1 and C-3). Consensus of opinion indicates that this product has the 5,6-dihydro-1,3,5-dithiazine structure (A). Another such product is described below (Preparation XII) and is believed to have either the 3,7-dithia-1,5-diazabicyclo(3.3.1)nonane structure (B) or the 3,3'-methylene-bis-(1,3-thiazetane) structure (C), but in any event a structure unlike the so-called pentamethylenediaminodisulfide (A).

The last three reactions are limited to ammonia since they require that the three valencies of the nitrogen be satisfied by methylene groups. In the first two reactions, however, a primary amine may also be used as only two of the nitrogen valencies are attached to methylene groups. Secondary and tertiary amines, of course, would not yield cyclic aminomethyl sulfides. Aliphatic aldehydes other than formaldehyde also may be used in these reactions, and they operate to introduce methylene substituents.

From the foregoing it will be apparent that a cyclic aminomethyl sulfide is necessarily obtained by reacting hydrogen sulfide, an aliphatic aldehyde, and ammonia or a primary aliphatic amine. Thus, though these products comprise simple four and six-membered rings and even a nine-membered bicyclic system, nonetheless these superficially diverse types are closely related structurally in that all members, regardless of ring size or structure, are built up solely from three units, namely, the aldehyde residue (the methylene or mono-substituted methylene group), the nitrogen base residue (the amino or mono-substituted group), and divalent sulfur. Each of these contributes two co-valent bonds to the single ring of which it is a part and unite, with the others in the fixed sequence wherein the hetero atoms alternate with the carbon atoms, in saturated ring structures. Thus, all adjacent units in the ring are different, and nitrogen-sulfur linkages do not exist. It follows, therefore, that the three groups are combined in definite proportions, thus: In the simple ring structures, such as 1,3-thiazetane, formothialdine, thialdine, etc., the number of methylene carbon atoms equals the sum of the nitrogen and sulfur atoms; and, in the more complex structures, such as the $C_5H_{10}N_2S_2$ structures A, B, and C, there is one more methylene carbon atom than the sum of the nitrogen and sulfur atoms.

Thus, it may be readily discerned that there is a clear line of demarcation between the cyclic aminomethyl sulfides of this invention and sundry other nitrogen-carbon-sulfur heterocyclic structures such as the thiamorpholines, the thiazoles, the benzothiazoles, the thiazolidines, the thiazines, the 1,3,4-thiadiazines, the thiurets, etc.

The compounds under consideration herein may for the most part be represented by the comprehensive formula

in which M is the methylene or mono-substituted methylene group, $n$ is 1 or 2, and Z is the nitrogen-containing member which completes the fixed sequence —C—S—C—N— and closes the ring system. Z will be the ammonia or amine residue G (i. e., an NH or substituted NH group), or the divalent group —G—M—S—, or the tetravalent group >N—M—N<. In the first two cases $n$ is 1, and in the third $n$ is 2. The fixed sequence —C—S—C—N— thus occurs one or more times in the ring system.

Now it has been found that the class of compounds described above as cyclic aminomethyl sulfides are especially useful for preventing or checking the development of destructive microorganisms. It has been found, for example, that these compounds are many times as effective as fungicides as the commonly used copper compounds, such as copper sulfate, cuprous oxide, etc., and that they are free of the objectionable toxic properties associated with such fungicides as the organic mercurials and phenols or chlorphenols.

Evaluation of a wide variety of these compounds synthesized according to the prior art referred to above, as well as by modified and apparently novel methods, indicates that these desirable properties are associated with the characteristic saturated heterocyclic ring structure, which as pointed out above is composed of carbon, nitrogen, and sulfur atoms with the carbon atoms alternating with the hetero atoms. Cyclic aminomethyl sulfides having the same reported structure and differing only in respect to the nature of the substituents attached to the methylene group or the amino group exhibit the same high characteristic toxicity to destructive micro-organisms. Likewise, cyclic aminomethyl sulfides prepared by widely differing methods all exhibit the same desirable properties.

Typical specific preparations of materials useful in the present invention are given below. Parts are by weight.

*Preparation I*

3-isobutyl-1,3-thiazetane was prepared according to the method used by Le Févre and Le Févre (reference A-1 above) for the corresponding methyl derivative. The reaction is as follows:

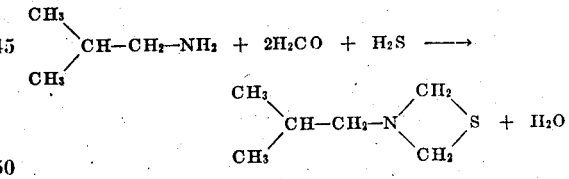

A solution of 73 parts of isobutylamine in 400 parts of water was saturated with hydrogen sulfide at 0° C., a total of 33 parts by weight of the gas being absorbed. This solution was then gradually added during the course of a half hour to a well stirred mixture of 162.2 parts of 37% aqueous formaldehyde solution and 400 parts of ice. The mixture was allowed to stir for 1½ hours longer and the oily product separated with ether. After drying the ether solution over sodium sulfate the solvent was evaporated and the oil vacuum-distilled. There was obtained 75 parts of a light yellow oil that boiled at 101–105° C./3 mm. and contained 22.41% sulfur and 10.8% nitrogen.

*Preparation II*

5-methyl-5,6-dihydro-1,3,5-dithiazine (N-methyl-formothialdine) was prepared according to the method of Le Févre and Le Févre (J. Chem. Soc. 1932, 1142–1148). The crude product was a white crystalline solid melting at 58–63° C., which after recrystallizing from methanol melted at 62–4° C. Analysis showed sulfur and nitrogen contents of 47.34% and 9.80%, respectively.

*Preparation III*

2,4,6-trimethyl-5,6-dihydro-1,3,5-dithiazine is the cyclic aminomethyl sulfide described in the literature under the name "thialdine" (see Richter's Organic Chemistry, 2nd ed., 1929, vol. I, p. 209) and assigned the formula

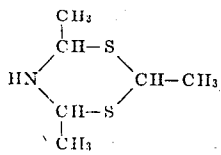

The compound was prepared as follows: To a solution of 66 parts of acetaldehyde in 200 parts of water cooled below 20° C. there was added with good stirring 150 parts of 11.3% ammonium hydroxide solution. Then, while keeping the temperature at 10–15° C., hydrogen sulfide was passed into the solution for five hours. The white crystals that separated were filtered off, washed thoroughly with water and dried. Sixty-two parts of thialdine was obtained, melting at 42–4° C. and corresponding closely to the substance described in the literature. Thialdine is insoluble in water but very soluble in most organic solvents including the liquid hydrocarbons.

Formothialdine is reported in the literature to have the simple ring structure

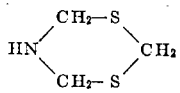

but invariably the product actually obtained in the reaction of ammonia, hydrogen sulfide and formaldehyde is insoluble and resinous and probably comprises a mixture of ring compounds and polymers. Following are three different preparations of so-called formothialdine, all of which have fungicidal value.

*Preparation IV (Formothialdine I)*

A solution of 120 parts of sodium sulfide hydrate ($Na_2S \cdot 9H_2O$) and 60.8 parts of 37% aqueous formaldehyde in 300 parts of water was added dropwise to a solution of 13.4 parts ammonium chloride and 63 parts sodium bicarbonate in 600 parts of water with good stirring and with sufficient cooling to maintain the temperature at 15° C. The stirring was continued for one hour longer during which time the temperature was allowed to rise to 25° C. The reaction product consisted of a semi-liquid resin, which after warming on the steam bath to completely liquefy it, was washed several times by decantation with water. It was then cooled, ground with water, filtered off, and after finally washing again with water was dried in vacuo. There was obtained 21 parts of a white amorphous powder that began to sinter at 75° C. and melted at 110–160° C. This material had the following composition: 41.8% sulfur, 13.70% nitrogen, 34.91% carbon and 5.95% hydrogen.

*Preparation V (Formothialdine II)*

A formothialdine dispersion was prepared by carrying out the reaction in the presence of an emulsifying agent as follows: 90.8 parts of 18.7% aqueous ammonia was saturated with hydrogen sulfide at 0° C. and atmospheric pressure, under which conditions 29 parts of the gas was absorbed. This ammonium sulfide solution was then mixed with 60 parts of a 10% solution of medium viscosity, partially hydrolyzed polyvinyl acetate containing 0.3 part of sulfated dodecanol. With cooling to maintain the temperature at 15° C. and with good stirring, 103.7 parts of 37% aqueous formaldehyde solution (the theoretical amount) was slowly dropped in. The formothialdine separated immediately in the form of a very fine emulsion. The total weight of formothialdine emulsion containing excess ammonia was 283.5 parts. Most of the excess ammonia was removed when the dispersion was concentrated to 229 parts by vacuum evaporation at 65° C. The total solids content of this emulsion was 24.2% which represented approximately 20% formothialdine.

*Preparation VI (Formothialdine III)*

A 20% aqueous solution of formaldehyde was slowly added to 400 parts of a 10% aqueous solution of ammonium sulfide (with good stirring and cooling below 15° C.) until no further precipitation occurred. The precipitate was then filtered off, washed and dried. The product consisted of 52 parts of light yellow insoluble powder that slowly sintered on heating and melted with decomposition between 158 and 173° C. This material contained 34.15% sulfur and 17.30% nitrogen.

*Preparation VII*

*(Pentamethylenediaminodisulfide I)*

5-(methyleneaminomethyl)-5,6-dihydro-1,3,5-dithiazine (so-called pentamethylenediaminodisulfide) was prepared according to the method of U. S. Patent 2,084,011 by the action of formaldehyde upon aqueous ammonium hydrogen sulfide. The product obtained was a white, resinous, insoluble powder which melted at 135–150° C. It is alleged to have the cyclic aminomethyl sulfide structure

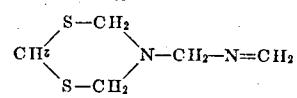

*Preparation VIII*

5-(2'-benzothiazolylthiomethylaminomethyl)-5,6-dihydro-1,3,5-dithiazine was obtained according to the method of Example I in the above patent by refluxing a toluene solution of mercaptobenzothiazole with pentamethylenediaminodisulfide. An 83% yield of a white amorphous powder melting at 203–205° C. was obtained. The suggested formula is as follows:

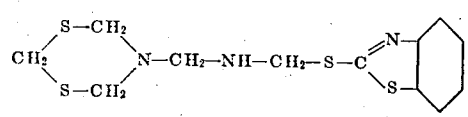

*Preparation IX*

*(Pentamethylenediaminodisulfide II)*

This product was prepared according to the method described in Example I of U. S. Patent 2,050,204. The product obtained was similar to that of Preparation VII and had an indefinite melting point in the range of 130–145° C. It is alleged to have the same structure.

Preparation X

(Pentamethylenediaminodisulfide III)

This material was prepared according to the method described by Le Févre and Le Févre (J. Chem. Soc. 1932, 1147). The product was similar to that of Preparations VII and IX and had an indefinite melting point in the range 130-155° C. See reference C—2, supra.

An especially effective preparation related to the so-called pentamethylenediaminodisulfides in that the principal reaction product has the same molecular formula ($C_5H_{10}N_2S_2$), but having different physical properties and markedly superior biological properties, was prepared as follows:

Preparation XI

A solution of 1635 parts of 37% aqueous formaldehyde solution and 540 parts of ammonium chloride is placed in a container surrounded by a cooling bath and provided with a stirrer. The resulting mixture is highly acidic. A separate solution of 1200 parts of crystalline sodium sulfide ($Na_2S \cdot 9H_2O$) in 2000 parts of water is prepared. To the formaldehyde-ammonium chloride solution is slowly added one-half of the sodium sulfide solution while stirring and maintaining the temperature of the reaction mixture between 5° and 10° C. by means of ice and salt in the cooling bath. The acidity of the mixture is now about pH2. The addition of 398.6 parts of acetic acid is next started, and the addition of the remaining sodium sulfide solution is continued at such a rate that the addition of both is completed simultaneously, at which time the pH is about 4.5. The rates are adjusted so that the temperature of the reaction mixture during the addition remains between 5° and 10° C. The reaction mixture is allowed to stand over night, after which the white product is filtered off and washed with water. Depending upon the amount of washing, from 400 to 455 parts of product melting at 130-150° C. was obtained.

The crude product of Preparation XI comprised a mixture that could be separated by fractional crystallization from ethylene chloride as follows:

Preparation XII

Fifty parts of the crude product were dissolved in hot ethylene chloride. On cooling, 24 parts of white crystals melting at 176-178° C. was obtained. This product was found to have the molecular formula, $C_5H_{10}N_2S_2$. The melting point of this product can be raised to 183° C. by several further crystallizations.

While the products obtained by Delepine (Ref. C–1) and Le Févre and Le Févre (Ref. C-2) have the same empirical formula $C_5H_{10}N_2S_2$, nevertheless the melting points (Delepine 198° C., and Le Févre and Le Févre 200° C.) are substantially higher. It is evident, therefore, that this product is quite different from the product of Delepine and Le Févre and Le Févre. This is also evident by the fact that the crude product (Preparation XI) and the crystallized product (Preparation XII) have much higher fungicidal activity than any of the so-called pentamethylenediaminodisulfide preparations.

Preparation XIII

After the crystallization described in Preparation XII the ethylene chloride solution was evaporated, yielding 26 parts of a pale yellow, amorphous solid which exhibited fungicidal properties equivalent to those of Preparations XI and XII.

It will be evident that numerous other cyclic aminomethyl sulfide preparations may be formulated according to the above processes by choosing as reagents suitable primary amines and aldehydes. Thus, methylamine, ethylamine, monoethanolamine, propylamine, butylamine, isobutylamine, cyclohexylamine, etc., may be used to introduce the corresponding alkyl groups as nitrogen substituents. Also, acetaldehyde, propionaldehyde, butyraldehyde, valeraldehyde, isovaleraldehyde, hexahydrobenzaldehyde, etc., may be used to introduce methylene substituents.

It will be evident also that the hydrogen sulfide may be introduced in various ways. For example, it may be introduced as such, or it may be produced in situ by hydrolysis of an alkali or alkaline earth metal sulfide, ammonium sulfide, an alkylammonium sulfide, or a sulfide of a quaternary ammonium base.

Also, other processes lead to the same or related types of cyclic aminomethyl sulfides. For example, thialdine (Preparation III) may be prepared by the action of hydrogen sulfide on aldehydeammonia (Ref. B-4) or by reacting ammonia with alpha-trithioacetaldehyde (Richter's Organic Chemistry, 2nd ed. 1929, vol. I, p. 209). Likewise, N-methylthialdine may be prepared by the method of Markwald (Ref. B-5), i. e., by the action of methylamine on thioacetaldehyde. Similarly, Graymore (Ref. A-2) obtained 3-methyl-1,3-thiazetane by saturating an aqueous solution of trimethyltrimethylenetriamine

with hydrogen sulfide. While it might appear that products thus obtained could not be considered condensation products of a primary aliphatic amine or ammonia, an aliphatic aldehyde and hydrogen sulfide, closer examination will show otherwise. Thus, aldehydeammonia is a condensation product of acetaldehyde and ammonia; trimethyltrimethylenetriamine, of formaldehyde and methylamine; and the thioaldehydes are condensation products of acetaldehyde and hydrogen sulfide, the alpha-trithioacetaldehyde being a polymer of thioacetaldehyde. However, we mean to include cyclic aminomethyl sulfides as hereinbefore defined, whether formed by processes disclosed above or by other entirely different processes.

The effectiveness of the preparations described above in controlling the development and growth of micro-organisms is illustrated in the following tables. The fungicidal evaluations were carried out by a standard agar plate method which has proved entirely reproducible and reliable. In this method, a dispersion containing a definite concentration of the fungicide candidate is prepared in sterile liquid malt agar (a warm solution containing 2% malt and 2% agar having a pH of 5.7). To effect the dispersion of resinous materials it has been found convenient and very satisfactory to grind the material with dry agar. The liquid agar is then poured into sterile Petrie dishes and after hardening the surface is uniformly sprayed with a suspension of the test fungus. The test is allowed to run for two weeks, at the end of which period the concentration of fungicide that inhibits all fungus growth is noted. For the bactericide tests, a similar technique is used except that the nutrient medium consists of a 2.3% solution of Bacto Nutrient Agar, dehydrated (a product of the Difco Laboratory, Detroit, Mich.) with a pH of 6.7.

Table I

| Preparation | | Minimum effective concentration | |
|---|---|---|---|
| | | *Aspergillus niger* | Mixed lumber molds (*Penicillium expansum Trichoder ma lignorum*) |
| I | 3-Isobutyl-1,3-thiazetane | 1:16,000 | *1:16,000 |
| II | N-methylformothialdine | 1:16,000 | *1:16,000 |
| III | Thialdine | 1:4,000 | 1:8,000 |
| IV | Formothialdine I | 1:2,000 | *1:2,000 |
| V | Formothialdine II | 1:10,000 | 1:10,000 |
| VI | Formothialdine III | 1:4,000 | 1:8,000 |
| VII | Pentamethylenediaminodisulfide I | 1:400 | |
| VIII | 5-(2'-Benzothiazolyl-thiomethylaminomethyl)-5,6-dihydro-1,3,5-dithiazine | 1:400 | |
| IX | Pentamethylenediamino-disulfide II | 1:2,000 | 1:2,000 |
| X | Pentamethylenediamino-disulfide III | 1:1,000 | 1:1,000 |
| XI | Crude product | 1:16,000 | *1:16,000 |
| XII | Recrystallized product | 1:16,000 | *1:16,000 |
| XIII | Residue | 1:16,000 | *1:16,000 |

*All growth of air and water-borne contaminating bacteria was also absent.

The materials in the above table are also effective against many other kinds of fungi. The following table of further agar plate tests of Preparation XI against a variety of organisms is illustrative:

Table II

| Organism | Minimum effective concentration |
|---|---|
| Common black mold (*Aspergillus niger*) | 1:16,000 |
| Green lumber mold (*Trichoderma lignorum*) | 1:16,000 |
| Common blue mold (*Penicillium* sp.) | 1:16,000 |
| Wood rotter (*Fomes annosus*) | 1:16,000 |
| Wood rotter (*Lenzites trabea*) | 1:8,000 (plus) |
| Blue stainer of wood (*Diplodea natalensis*) | 1:4,000 (plus) |
| Blue stainer of wood (*Endoconidiophora coerulescens*) | 1:8,000 (plus) |
| Blue stainer of wood (*Ceratostomella pilifera*) | 1:8,000 |
| Fabric destroyer (*Chaetomium globosum*) | 1:8,000 |
| Brine inhabitors (Leather bacteria) | 1:14,000 |
| Leather mold (*Aspergillus fumigatus*) | 1:16,000 |
| Leather mold (*Penicillium* sp.) | 1:16,000 |
| Tomato leaf mold (*Cladosporium fulvum*) | 1:12,000 |

The cyclic aminomethyl sulfides also function as preservatives for rawhide, Preparation XII in particular being extremely efficient and superior to materials heretofore used for the purpose, as will be apparent from the following: Several samples of rawhide were salted with one-quarter of their weight of a salt mixture containing from 0.25 to 2% (on the weight of the salt) of Preparation XII, and were then incubated for three months in a humidity chamber in which the relative humidity was maintained at 90% at 25° C. During this period, at intervals of two weeks, the rawhide samples were sprayed with suspensions of Brineophilus bacteria and the fungi, *Aspergillus fumigatus*, *Aspergillus niger* and various Penicillia. At the end of the test, all samples treated with Preparation XII, even at the lowest concentrations, were perfectly preserved. On the other hand, three control samples salted as above with plain salt, salt containing 2% sodium fluosilicate, and salt containing 0.5% p-nitrophenol, respectively, were all badly decomposed.

The cyclic aminomethyl sulfides are also useful for preserving liquid glue, as is demonstrated by the following: A small amount of Preparation XII was dispersed in a hot 10% glue solution and then cooled to harden. Test samples were inoculated with liquefying bacteria and rated after five days on the basis of decomposition as shown by the development of bad odor and liquefaction. The following table shows the performance of the cyclic aminomethyl sulfide as compared to other well known glue preservatives.

Table III

| Preservative | Concentration | Result |
|---|---|---|
| | Percent | |
| Preparation XII | 0.0125 | Solid, no odor. |
| Zinc sulfate | 1.5 | Solid, no odor. |
| | 0.75 | Liquid, bad odor. |
| Thymol | 0.40 | Solid, no odor. |
| | 0.20 | Liquid bad odor. |
| Salicylanilide | 0.20 | Liquid, bad odor. |
| None (check) | | Do. |

The cyclic aminomethyl sulfides are also highly effective for the control of plant diseases. Thus, the highly satisfactory results obtained with Preparation XII as a protective spray for tomato leaf mold is shown by the data of Table IV. Potted tomato plants were sprayed every week for four weeks with spray suspensions of the fungicides at the concentrations indicated. During the same period at 3½ day intervals the plants were inoculated with an aqueous suspension of the spores of *Cladosporium fulvum*. The superiority of the cyclic aminomethyl sulfide over commonly used plant fungicides is obvious.

Table IV

| Fungicide | Spray concentration** | Per cent of leaf surface infested |
|---|---|---|
| Preparation XII* | 1:200 | 0 |
| | 1:400 | 0.7 |
| | 1:800 | 2.0 |
| Tribasic copper sulfate | 1:200 | 25.0 |
| Basic copper calcium chloride | 1:200 | 4.0 |
| Cuprous oxide | 1:200 | 5.4 |
| None (check) | | 85.0 |

*Spray solids consisted of 50% active ingredient, 25% bentonite, and 25% clay.
**Active ingredient basis.

The above spray composition also has curative powers, i. e., it will restore to a healthy condition plants already infested with a fungous disease. Roses heavily infested with *Spaerotheca* sp. and bean plants likewise heavily infested with *Erysiphe* sp. were sprayed with Preparation XII, compounded as noted in Table IV, at a concentration of 1:400 (on active ingredient basis). Five days after spraying all visible signs of mildew had disappeared in both cases. Tribasic copper sulfate and basic copper calcium chloride employed as controls caused no visible reductions of the mildew infestations.

The cyclic aminomethyl sulfides are, further, highly efficient in soil treatment to prevent damping off of seedlings, for which purpose they have a high protective action and cause no chemical injury. Thus, seeds of sage, petunia, torenia, and snapdragn were sown and the surrounding soil was watered with a dispersion containing 50% Preparation XI, 25% bentonite, and 25% clay at a concentration of 1 to 12000 (on the active ingredient basis). Cuprous oxide at a concentration of 1 to 400 was used as a control. After three weeks' time, the following observations of (1) damping off control and (2) chemical injury were made:

Table V

| Plant | Preparation XI compounded | | Cuprous oxide | | Check control |
|---|---|---|---|---|---|
| | Control | Injury | Control | Injury | |
| | Percent | Percent | Percent | Percent | Percent |
| Sage | 100 | 0 | 100 | 75 | 100 |
| Petunia | 75 | 0 | 50 | 75 | 25 |
| Torenia | 75 | 0 | 100 | 50 | 25 |
| Snapdragon | 100 | 0 | 100 | 50 | 25 |

From the foregoing it will be seen that the cyclic aminomethyl sulfides of this invention are exceptionally effective fungicides and bactericides. They are of particular advantage in that they combine high toxicity with high tolerance. In many instances they exhibit a toxicity to the more common fungi at least thirty times that of the more commonly used copper compounds such as copper sulfate, cuprous oxide and the like, and at the same time they are relatively non-toxic to the host and higher animal, and to plant life in general. Thus, they are free from the toxic residue problem encountered with copper, zinc, arsenic and mercury compounds and have none of the destructive action on living tissue that is characteristic of the phenols and chlorophenols. Moreover, they are easily prepared in simple equipment from inexpensive raw materials, and in most cases the crude reaction product need not be purified before use.

The agents of this invention may be used to prevent the bacterial and fungous decay and putrefaction of such materials as rawhides, glue, gelatin, starch pastes, leather, cellulosic substances, alkyd resins, and any other natural or manufactured product that is subject to attack and decomposition by various bacteria and molds. These agents are also useful in soil sterilization and seed disinfecting to prevent and control damping off. The cyclic aminomethyl sulfides have proved outstanding in the control of mildew and other fungus diseases to which living plants are subject. Not only are these agents effective in preventing mildew attack, but they are also valuable in obliterating established infestations of such diseases without danger to the life of the plant.

The cyclic aminomethyl sulfides may be used also for the control of various other types of pests within the meaning of this term as set forth in U. S. Patent 2,165,030, granted July 4, 1939, on an application of E. W. Bousquet, Serial No. 143,730, filed May 20, 1937. They may be used to protect greenhouse plants from attack by the slugs or snails which commonly infest greenhouses. By dusting the soil or peat moss on which potted plants are placed with a cyclic aminomethyl sulfide, e. g., Preparation XII, the snails and slugs are effectively kept off the plants. The cyclic aminomethyl sulfide appears to present a barrier to the migration of the pests from the soil or peat moss to the plants. The agents may be used also in controlling insects and are most useful in this regard as stomach poisons or repellents.

In the application of these products for pest-control, they may be combined with other supplementary agents such as talc, bentonite, clays, spreading agents, stickers, and other adjuvants. These may be applied in the form of dry dusts, in solutions of organic solvents, or in the form of dispersions. They may also be used in combination with other fungicides such as copper oxide, thymol, etc., and insecticides such as lead arsenate, phenothiazine, barium fluosilicate, and the like for the purpose of controlling several different pests with one spray application. The cyclic aminomethyl sulfides, being nitrogen bases, may also be applied in the form of their acid addition salts.

Since the cyclic aminomethyl sulfide may take many apparently widely differing forms and in many cases cannot be isolated and identified by any specific formula, it is to be understood that the invention is not to be construed as limited to any of the particular preparations or particular consideration outlined above save as set forth in the appended claims.

I claim:

1. A pest-control composition containing as an essential active ingredient a cyclic aminomethyl sulfide.

2. In the art of pest-control the method of immunizing organic matter from attack of economically harmful micro-organisms which comprises treating said materials with a cyclic aminomethyl sulfide.

3. A pest-control having micro-organism devitalizing properties comprising a cyclic aminomethyl sulfide.

4. A fungicidal and bactericidal composition containing as an essential active ingredient a heterocyclic compound having a saturated ring structure composed of carbon, nitrogen, and sulfur atoms in which the carbon atoms alternate with the hetero atoms obtained by condensing an aliphatic aldehyde, hydrogen sulfide, and a substance selected from the group consisting of primary aliphatic amines and ammonia.

5. A fungicidal and bactericidal composition containing as an essential active ingredient a heterocyclic compound having at least one fixed sequence —C—S—C—N— comprised in the structure

in which M is an aliphatic group selected from the class consisting of methylene and mono-substituted methylene groups, $n$ is 1 or 2, and Z is a nitrogen-containing member which completes the fixed sequence —C—S—C—N— and closes the ring system.

6. A fungicidal and bactericidal composition containing as an essential active ingredient a heterocyclic compound having the formula

in which M is an aliphatic group selected from the class consisting of methylene and mono-substituted methylene groups, and $n$ is 1 or 2, said compound being characterized in that when $n$ is 1, Z is a divalent radical selected from the class consisting of a nitrogen base residue G and the radical —G—M—S—, and, when $n$ is 2, Z is the tetravalent group

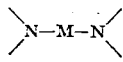

7. A fungicidal and bactericidal composition containing as an essential active ingredient 3-isobutyl-1,3-thiazetane.

8. A fungicidal and bactericidal composition containing as an essential active ingredient N-methyl formothialdine.

9. A fungicidal and bactericidal composition containing as an essential active ingredient thialdine.

NORMAN E. SEARLE.